Aug. 28, 1962  F. W. LIVERMONT  3,050,978
CALIBRATION DEVICE FOR TORQUE MEASURING TOOLS
Filed June 30, 1960

INVENTOR.
FRANK W. LIVERMONT
BY
ATTORNEYS

United States Patent Office 3,050,978
Patented Aug. 28, 1962

3,050,978
CALIBRATION DEVICE FOR TORQUE MEASURING TOOLS
Frank W. Livermont, Duarte, Calif.; Milford S. Zimmerman, executor of said Frank W. Livermont, deceased, assignor to Reed Roller Bit Company, Houston, Tex., a corporation of Texas
Filed June 30, 1960, Ser. No. 40,079
4 Claims. (Cl. 73—1)

This invention relates to torque measuring and testing apparatus and is particularly directed to a device for calibrating a torque measuring and indicating instrument.

In my prior Patent No. 2,703,976, granted March 14, 1955, and in my co-pending application entitled Torque Measuring Apparatus, filed of even date herewith, are disclosed torque measuring and indicating devices for use with torque release wrenches and the like. The present invention relates to apparatus for calibrating such measuring and indicating instruments.

It is an important object of this invention to provide a calibrating device of the type described which employs a known weight acting through a known lever arm to apply a torque load, and which device is fully balanced within itself so that its weight does not affect the torque load applied. Another object is to provide such a device which includes an arcuate segment arm and a counterbalance plate which may be shifted about the axis of the segment arm to reduce the overall size of the device for portability. Other and more detailed objects will appear hereinafter.

Figure 1:
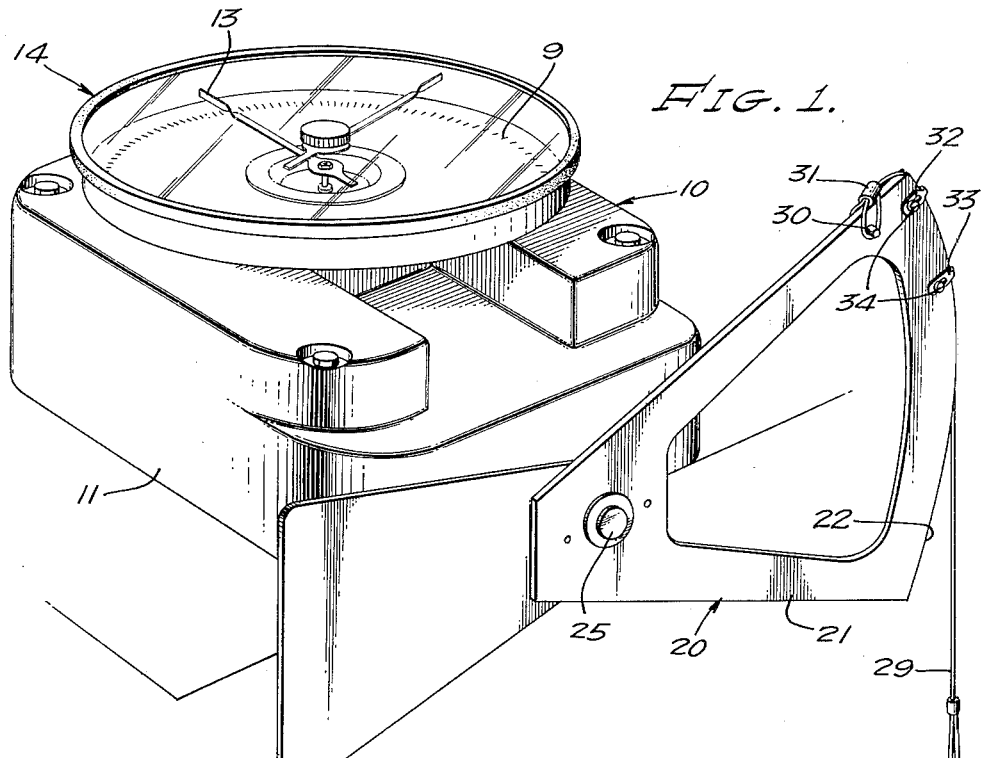
FIGURE 1 is a perspective view showing a preferred embodiment of this invention.
Figure 3:
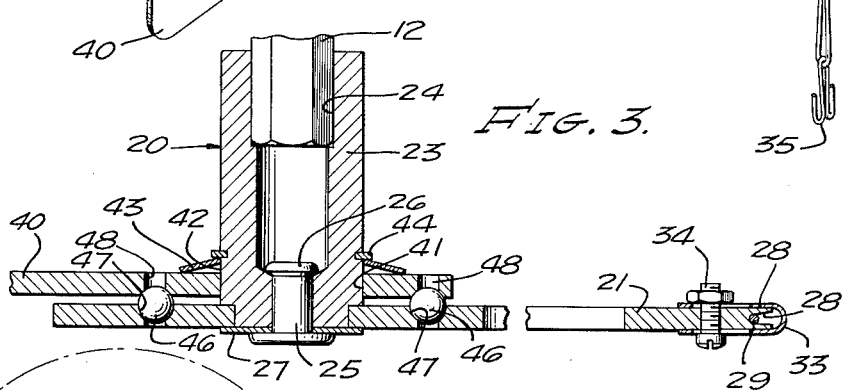
FIGURE 3 is a sectional view taken substantially on lines 3—3 as shown in FIGURE 2.

Referring to the drawings, the torque measuring and indicating instrument, generally designated 10, is preferably of the type shown in my co-pending application referred to above and it includes a base 11 having a noncircular projection 12 extending therefrom. This projection 12 constitutes a torque receiving member and the degree of torque load applied thereto is shown by the position of the indicator hand 13 within the dial gage assembly 14 mounted on the base 11.

In accordance with my invention I provide a calibration device, generally designated 20, for applying a known torque load to the non-circular projection 12. This device 20 includes a segment arm 21 having an arcuate periphery 22 which is concentric with the axis of the hub 23. This hub 23 has a non-circular socket 24 for reception of the non-circular projection 12. The hub is connected against axial separation with respect to the segment arm 21 by means of the central pin 25. The inner end 26 of the pin is distorted after assembly. The segment arm 21 and hub 23 are secured together and turn as a single unit.

A groove 28 is provided in the arcuate periphery 22 of the segment arm 21 and a flexible cable 29 is mounted in this groove 28. The upper end of the cable 29 is passed around the cross pin 30 on the segment arm 21 and held against this assembly by means of the clip 31. U-shaped retainers 32 and 33 are provided on the segment arm 21 near the upper portion of the arcuate periphery 22 for confining the cable 29 against escape from the groove 28. These retainers are held in place by means of threaded fastenings 34. The lower end of the cable 29 is provided with a hook 35 for supporting any one of a series of weights 36.

Figure 2:
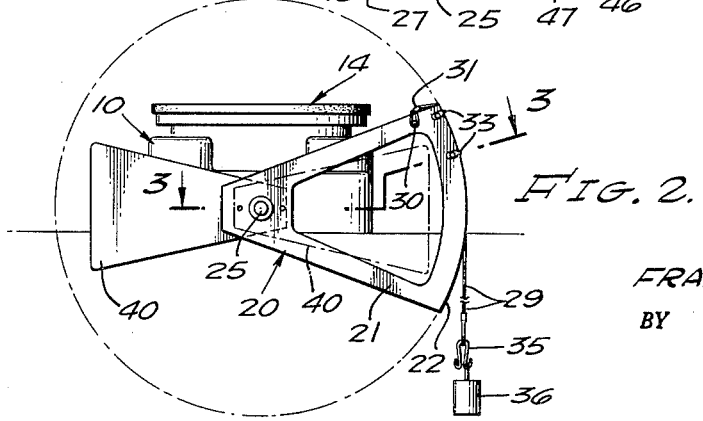
FIGURE 2 is a front elevation on a smaller scale.

A counterbalance plate 40 is provided for balancing the weight of the segment arm 21 and cable 29 and, as shown in these drawings, the counterbalance plate 40 is provided with a bore 41 which receives a cylindrical portion 42 of the hub 23. The plate 40 is free to turn with respect to the hub. A Belleville spring 43 and a separate retainer ring 44 serve to hold the plate 40 on the hub 23. Balls 46 mounted in sockets 47 provided on the segment arm 21 engage detents 48 provided on the counterbalance plate 40. The balls 46 and detents 48 are symmetrically mounted and are positioned one-half revolution apart. The strength of the Belleville spring 43 and the depth of the detents 48 are sufficient to hold the counterbalance plate 40 in extended position as shown in FIGURE 1. However, the counterbalance plate 40 may be swung to a restricted position as shown by the phantom lines in FIGURE 2 in order to reduce the size of the device for transportation. In the restricted position, as shown in FIGURE 2, it will be noted that the counterbalance plate 40 lies entirely within the outline of the segment arm 21. Since the balls 46 and detents 48 are mounted 180° apart, they serve to hold the counterbalance plate 40 in either of its two positions.

In operation the segment arm 21 and counterbalance plate 40 are moved about the axis of the hub 23 until the counterbalance plate 40 is in its extended position and maintained in such position by the action of the balls 46 and detents 48. The device 20 is then installed on the non-circular projection 12 which extends from the base 11 of the torque measuring and indicating instrument 10. Preferably, this initial installation is made with the segment arm 21 slightly above neutral position. A weight 36 of known magnitude is then attached to the cable clip 35 and the reading of the dial indicator 13 with respect to the stationary scale 9 is observed. Since the distance from the hub axis to the centerline of the cable 29 is known, for example 10 inches, and since the magnitude of the weight 36 is known, for example 5 pounds, a known torque load of 50 inch pounds is applied to the non-circular projection 12. The indicator hand 13 should accordingly move to a position on the scale 9 corresponding to 50 inch pounds. If it does not, suitable adjustments must be made within the internal mechanism of the instrument 10. Known weights 36 of greater and lesser magnitude are also applied in order to check the accuracy of the instrument 10 throughout its range of operation.

The device 20 has sufficient arcuate length to accommodate the full range of the instrument 10 and is installed in an inclined position and with the upper end of the peripheral arc 22 substantially above its neutral position, in order to allow sufficient rotary travel of the device 20 under the applied load so that the cable 29 does not touch the retainer 33.

Having fully described my invention it is to be understood that I do not wish to be limited to the details set forth herein but my invention is of the full scope of the appended claims.

I claim:

1. In a calibration device for a torque measuring instrument having a torque receiving member, the combination of: a segment arm having an arcuate peripheral portion, a hub having a cylindrical portion concentric with said arcuate peripheral portion, said hub being fixed to the segment arm and having means forming a detachable driving connection with the torque receiving member, a flexible cable contacting said arcuate peripheral portion and adapted to support a weight, means fixing one end of the cable to said segment arm, and a counterbalance mounted to move relative to the hub, the counterbalance having a bore receiving said cylindrical portion of said hub, the counterbalance being movable with respect to the segment arm from a retracted non-balancing position to an extended position in which it balances the weight of the segment arm and cable about said axis of the hub, and means for securing the counterbalance in said extended position.

2. In a calibration device for a torque measuring instrument having a torque receiving member, the combination of: a segment arm having an arcuate peripheral portion provided with a groove, a hub having a cylindrical portion concentric with said arcuate peripheral portion, said hub being fixed to the segment arm and having means forming a detachable driving connection with the torque receiving member, a flexible cable received in said groove and adapted at one end to support a weight, means fixing the other end of the cable to said segment arm, and a counterbalance mounted to turn on the hub, the counterbalance having a bore receiving said cylindrical portion of said hub, the counterbalance being movable with respect to the segment arm from a retracted non-balancing position to an extended position in which it balances the weight of the segment arm and cable about said axis of the hub, and means for securing the counterbalance in said extended position.

3. In a calibration device for a torque measuring instrument having a torque receiving member, the combination of: a segment arm having an arcuate peripheral portion provided with a groove, a hub having a cylindrical portion concentric with said arcuate peripheral portion, said hub being fixed to the segment arm and having a coaxial non-circular socket forming a detachable driving connection with the torque receiving member, a flexible cable received in said groove and adapted at one end to support a weight, means fixing the other end of the cable to said segment arm, and a counterbalance mounted to move relative to the hub, the counterbalance having a bore receiving said cylindrical portion of said hub, the counterbalance being turnable with respect to the segment arm from a folded position in which it lies within the outline of the segment arm to an extended position in which it balances the weight of the segment arm and cable about said axis of the hub, and means for securing the counterbalance in either of said positions.

4. In a calibration device for a torque measuring instrument having a torque receiving member, the combination of: a segment arm having an arcuate peripheral portion provided with a groove, a hub having a central axis at the center of said arcuate peripheral portion, said hub being fixed to the segment arm and having socket means forming a detachable driving connection with the torque receiving member, a flexible cable received in said groove and adapted at one end to support a weight, means fixing the other end of the cable to said segment arm and for confining the cable in one end of the groove, and a counterbalance plate mounted to turn on the hub, the counterbalance plate being turnable with respect to the segment arm from a folded position in which it lies within the outline of the segment arm to an extended position in which it balances the weight of the segment arm and cable about said axis of the hub, and detent means for securing the counterbalance plate in either of said positions.

References Cited in the file of this patent

UNITED STATES PATENTS

| | | |
|---|---|---|
| 1,000,201 | Seton | Aug. 8, 1911 |
| 2,342,919 | Chapman | Feb. 29, 1944 |
| 2,703,976 | Livermont | Mar. 15, 1955 |
| 2,909,055 | Fish | Oct. 20, 1959 |